(12) United States Patent
Jacques

(10) Patent No.: US 7,543,838 B2
(45) Date of Patent: Jun. 9, 2009

(54) TRAILER LOCKING MECHANISM

(75) Inventor: Kerry Jacques, Wind Lake, WI (US)

(73) Assignee: Master Lock Company LLC, Oak Creek, WI (US)

( * ) Notice: Subject to any disclaimer, the term of this patent is extended or adjusted under 35 U.S.C. 154(b) by 402 days.

(21) Appl. No.: 11/263,776

(22) Filed: Nov. 1, 2005

(65) Prior Publication Data

US 2006/0163842 A1 Jul. 27, 2006

Related U.S. Application Data

(60) Provisional application No. 60/624,064, filed on Nov. 1, 2004.

(51) Int. Cl.
*B60D 1/60* (2006.01)
(52) U.S. Cl. .................. 280/507; 280/506; 280/511; 280/512
(58) Field of Classification Search .................. 280/507, 280/506, 512, 511
See application file for complete search history.

(56) References Cited

U.S. PATENT DOCUMENTS

| | | | | |
|---|---|---|---|---|
| 3,977,221 | A | * | 8/1976 | Foote ............................ 70/58 |
| 4,291,557 | A | * | 9/1981 | Bulle et al. .................... 70/58 |
| 5,752,398 | A | | 5/1998 | Villalon, Jr. |
| 7,040,646 | B2 | * | 5/2006 | Pare ........................... 280/507 |
| 7,204,508 | B1 | * | 4/2007 | Hsai ........................... 280/507 |

* cited by examiner

*Primary Examiner*—Paul N Dickson
*Assistant Examiner*—Marlon A Arce
(74) *Attorney, Agent, or Firm*—Calfee, Halter & Griswold LLP

(57) ABSTRACT

An anti-theft mechanism for a trailer coupler designed such that it can be locked or secured to the coupler is such a manner that the coupler cannot be utilized. The mechanism includes a body, which is securable to the trailer coupler. The body includes a retention portion that is sized to mate with the lip portion of the trailer coupler. The mechanism also includes a lock cylinder, an extension member attached to the lock cylinder, and a locking pin moveable between retracted and extended positions. When the lock cylinder is rotated from the unlocked position to the locked position, the extension member moves the locking pin from the retracted position to the extended position.

12 Claims, 10 Drawing Sheets

US 7,543,838 B2

TRAILER LOCKING MECHANISM

CROSS-REFERENCE TO RELATED APPLICATIONS

This non-provisional application claims the benefit of U.S. Provisional Patent Application No. 60/624,064, entitled "Trailer Lock and Locking Mechanism," filed Nov. 1, 2004.

FIELD OF THE INVENTION

This invention relates generally to locking mechanisms and relates specifically to locking mechanisms for trailer couplers.

BACKGROUND OF THE INVENTION

Trailers are typically designed to be attached to a truck or other such vehicle capable of towing a trailer. To allow for this type of operation, trailers are commonly equipped with couplers. A coupler can be designed to attach to ball hitches located on towing vehicles. The ball hitch and coupler can be engaged to allow the vehicle to tow the trailer from one location to another.

Trailers often carry valuable items, such as boats, cars, or commercial goods. Anti-theft mechanisms that are capable of securing a trailer coupler from unauthorized use are desirable. Such anti-theft mechanisms can provide greater security against unauthorized towing for valuable items located on trailers that are idle and unattached to an authorized towing vehicle.

SUMMARY OF THE INVENTION

This invention and disclosure is directed at methods and apparatus for securing trailer couplers with anti-theft mechanisms or locking devices. The mechanisms and devices are designed to be locked or secured to a trailer coupler is such a manner that the trailer coupler cannot be attached to a ball hitch or otherwise utilized for towing.

An embodiment of the invention provides for an anti-theft mechanism for securing a trailer coupler. The mechanism includes a body that is securable to the trailer coupler. The mechanism includes a lock cylinder fixed to the body and rotatably moveable between locked and unlocked positions, an extension member attached to the lock cylinder, and a locking pin located proximate to the extension member and moveable between retracted and extended positions. When the lock cylinder is rotated from the unlocked position to the locked position, the extension member moves the locking pin from the retracted position to the extended position. When the lock cylinder is rotated from the locked position to the unlocked position, the locking pin moves from the extended position towards the retracted position.

Further features and advantages of the invention will become apparent from the following detailed description made with reference to the accompanying drawings.

DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention and other embodiments of the invention not described are encompassed by the claims.

DETAILED DESCRIPTION

This Detailed Description of the Invention merely describes embodiments of the invention and is not intended to limit the scope of the invention in any way. Indeed, the invention as described in the claims is broader than and unlimited by the preferred embodiments, and the terms used have their full ordinary meaning.

Figure 1:
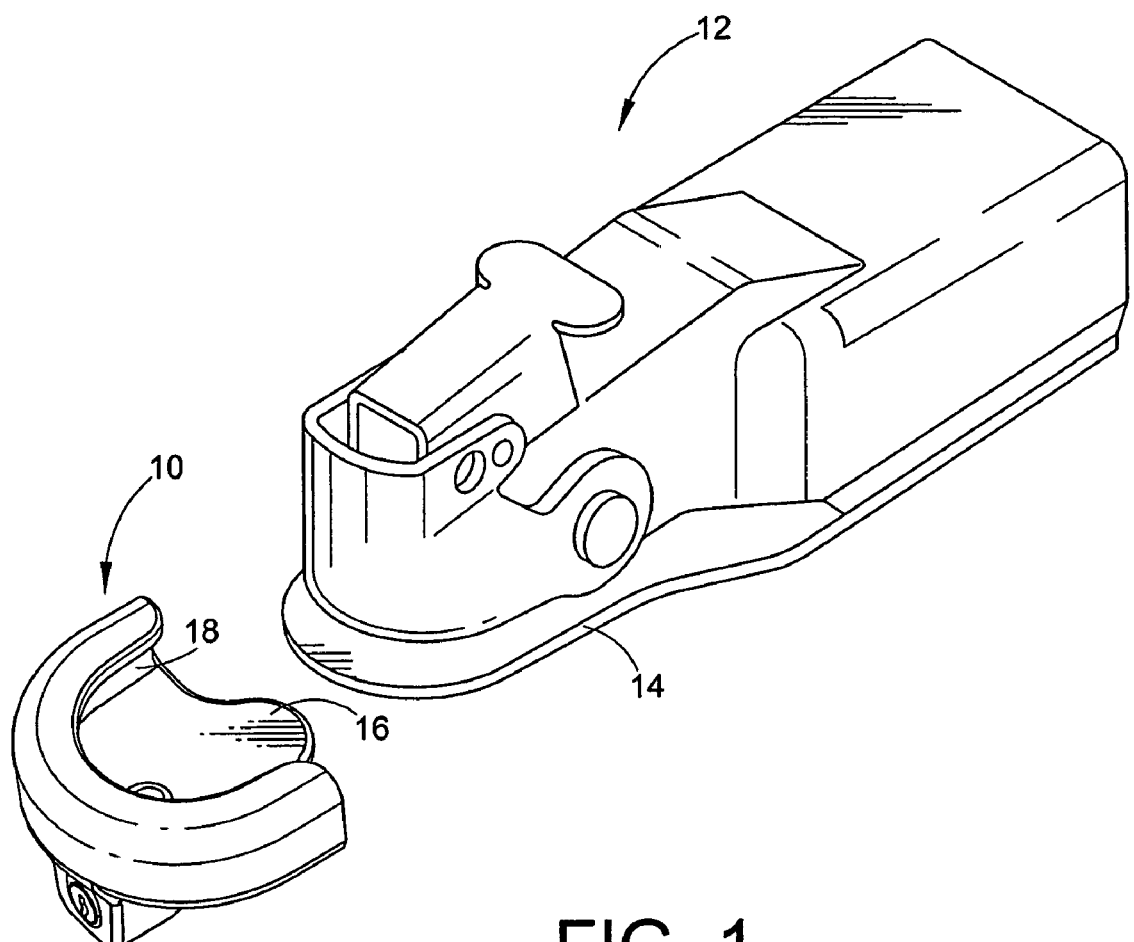
FIG. 1 is a perspective view of an anti-theft mechanism, constructed in accordance with an embodiment of the present invention, and a trailer coupler.
Figure 2:
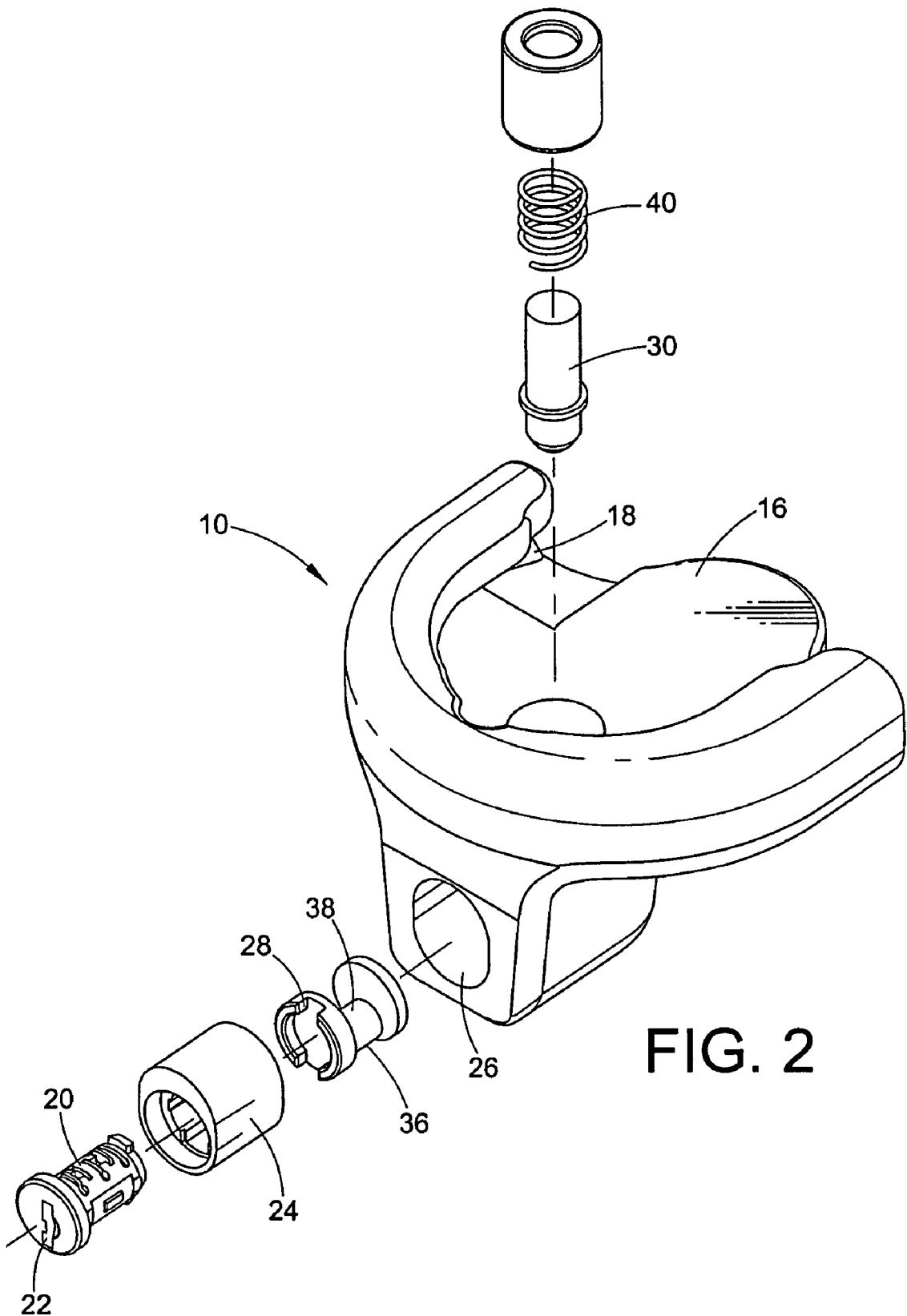
FIG. 2 is in an exploded view of the anti-theft mechanism of FIG. 1.

Referring to FIG. 1, an anti-theft mechanism 10 for securing to a trailer coupler 12 is illustrated. The anti-theft mechanism 10 is a locking device that can be locked or secured to the trailer coupler 12 such that the coupler 12 cannot be attached or coupled to a ball hitch or otherwise used for towing while the mechanism or device 10 is locked or secured to the trailer coupler 12.

The trailer coupler 12 includes a lip 14 along a portion of the coupler's 12 perimeter and a cavity (not shown) into which a ball hitch can typically be accommodated. This lip or lip portion 14 is commonly manufactured from a sheet steel. The locking device or mechanism 10 is also generally manufactured from a sheet steel and includes a body 16 that can be secured to the coupler 12. The body 16 includes a retention portion 18. The retention portion 18 is generally a groove that travels along an edge of the body 16. The retention portion or groove 18 is designed to mate with the lip portion 14 of the trailer coupler 12. The groove 18 may be manufactured by bending or otherwise manipulating a sheet of steel to form a generally unshaped groove into which the lip portion 14 of the coupler 12 can be accommodated. When the lip portion 14 is slid into and mated with the groove 18 in the body 16, the body 16 covers the ball hitch cavity and prevents the trailer coupler 12 from engaging with a ball hitch or other similar device. When the body 16 of the locking device 10 is in this position and secured by a lock to the coupler 12, the body 16 cannot be removed by an unauthorized user and, thus, the trailer coupler 12 cannot be engaged with a ball hitch.

Referring to FIGS. 2 through 6, an embodiment of the locking device 10 is illustrated. The locking device 10 includes a lock cylinder 20 attached to the body 16. The lock cylinder 20 is attached to the body 16 in such a manner that the lock cylinder 20 is able to rotate about its cylindrical axis. Typically, a lock cylinder 20 can be fitted with a key slot 22 into which a proper key can be fitted to enable the lock cylinder 20 to rotate between unlocked and locked positions. In this embodiment, the lock cylinder 20 is fitted into a sleeve 24, which is then fitted into an aperture 26 located in the body 16. A pin and tumbler system can be included in the cylinder 20 and the sleeve 24 to interact with a proper key to enable or disable rotation of the lock cylinder.

Figure 3:
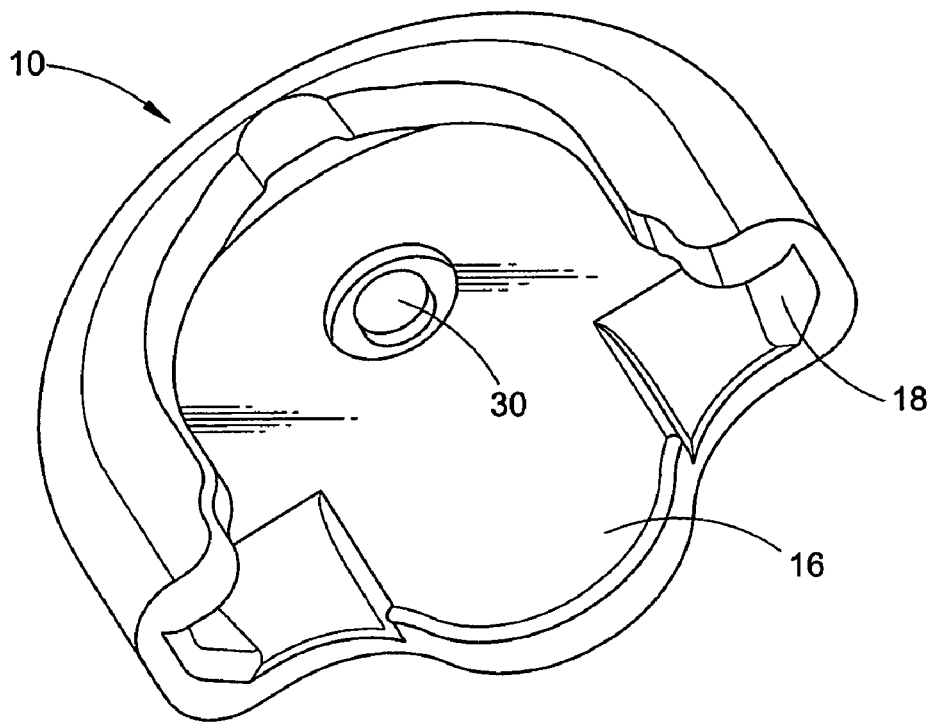
FIG. 3 is a perspective view of the anti-theft mechanism of FIG. 1 with a locking pin in a retracted position.
Figure 4:
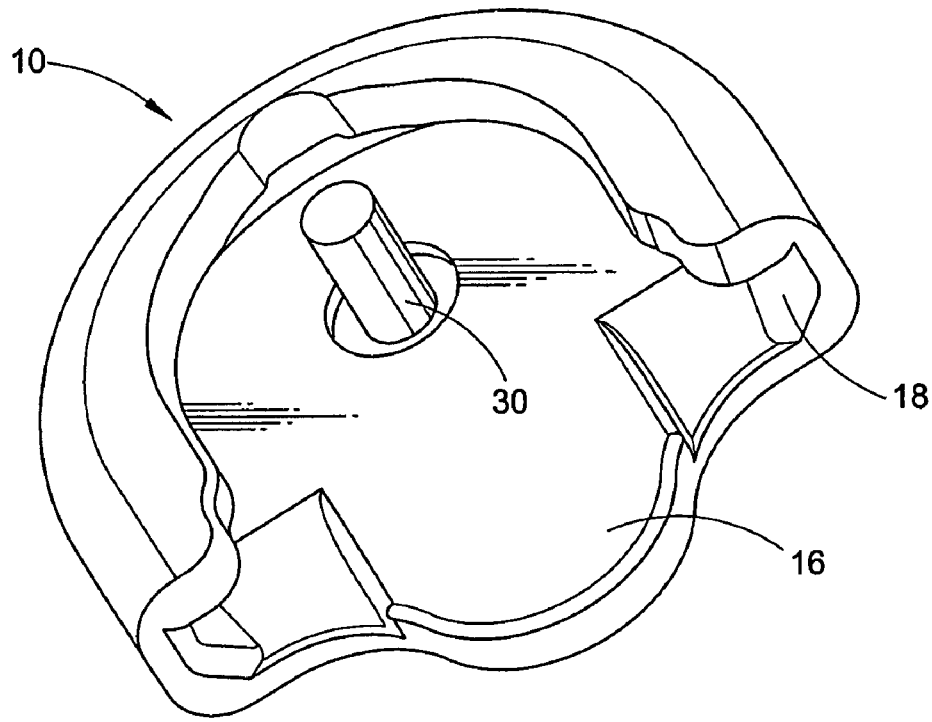
FIG. 4 is a perspective view of the anti-theft mechanism of FIG. 1 with the locking pin in an extended position.

Attached to the lock cylinder 20 is an extension member 28. The extension member 28 is attached in such a manner that the member 28 rotates as the lock cylinder 20 rotates. Located proximate to and normally in contact with the extension member 28 is a locking pin 30. The locking pin 30 is axially, or linearly, moveable between retracted and extended positions and is typically positioned to be generally transverse to the lock cylinder 20. The locking pin 30 in a retracted position, where the locking pin 30 is generally retracted or substantially retracted into the body 16, is illustrated in FIG. 3. The locking pin 30 in an extended position, where a substantial portion of the locking pin 30 is extended outside of the body 16, is illustrated in FIG. 4.

Figure 7:
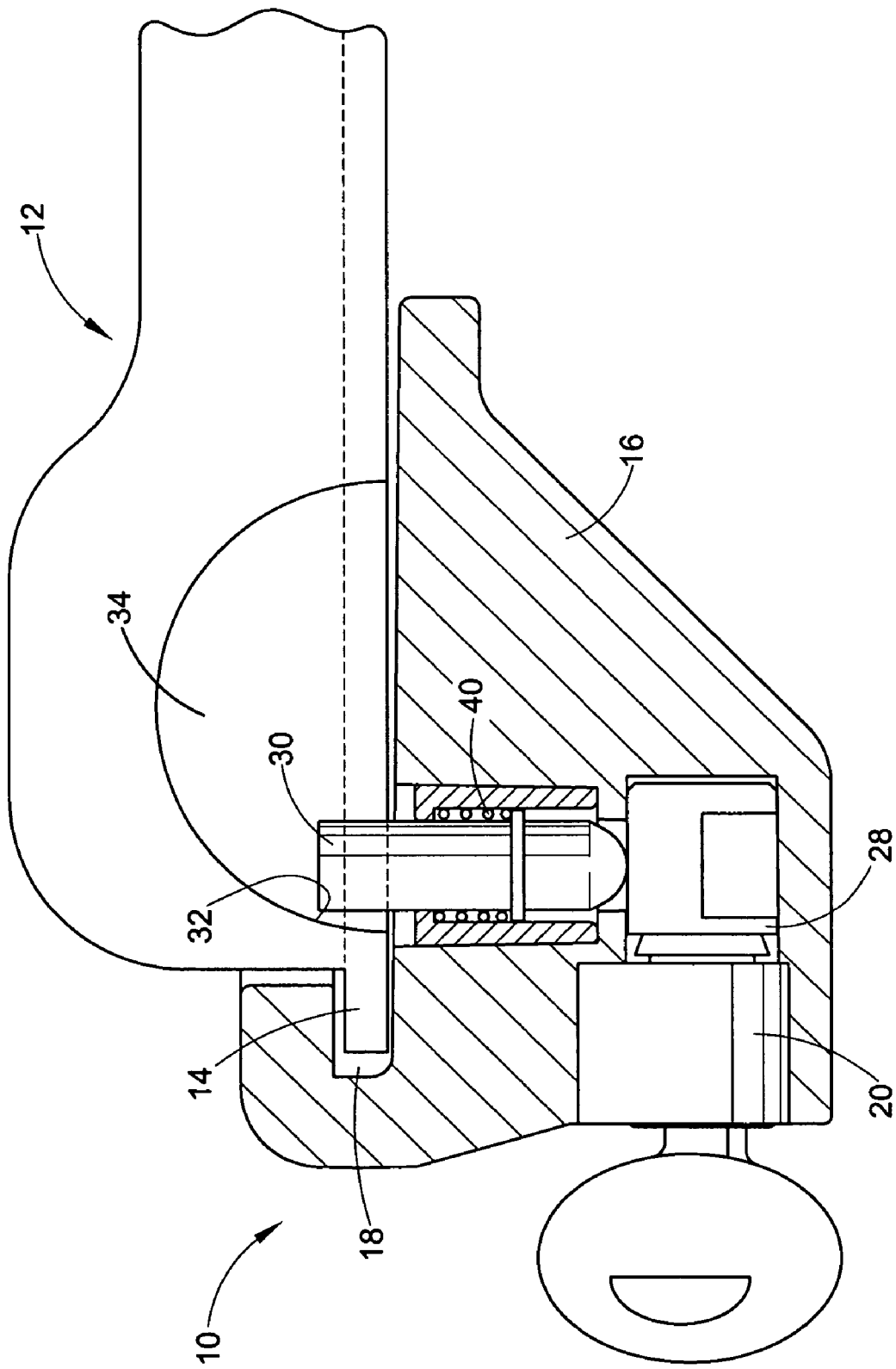
FIG. 7 is a cross-sectional view of the anti-theft mechanism of FIG. 1 secured to a trailer coupler, with the coupler shown in phantom lines.

As illustrated in FIG. 7, when the groove 18 in the body 16 is mated to the lip 14 of the trailer coupler 12, the body 16 can be secured to the coupler 12 by moving the locking pin 30 into an extended position. In the extended position, the locking pin 30 interferes with an inner surface 32 of a cavity 34 defined by the coupler 12. Thus, when the body 16 is secured to the coupler 12 by a locking pin 30 in an extended position, attempts to remove the body 16 from the coupler 12 are resisted by the interference of the locking pin 30 and the inner surface 34 of the cavity 32.

Figure 5:
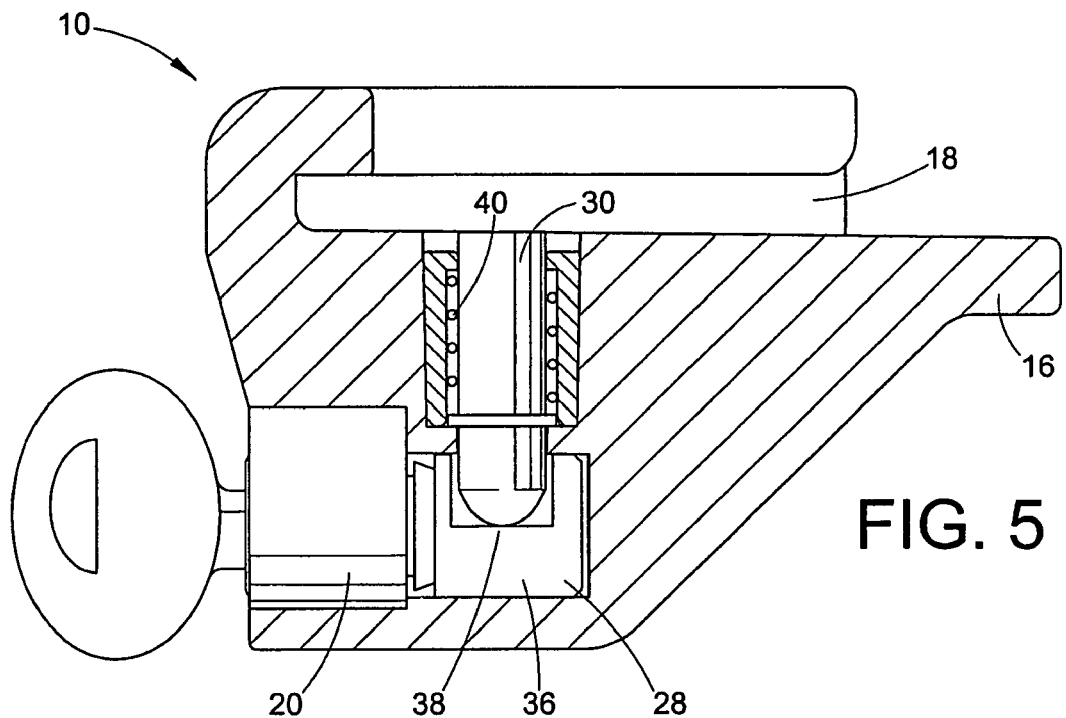
FIG. 5 is a cross-sectional view of the anti-theft mechanism of FIG. 1 with the locking pin in a retracted position.
Figure 6:
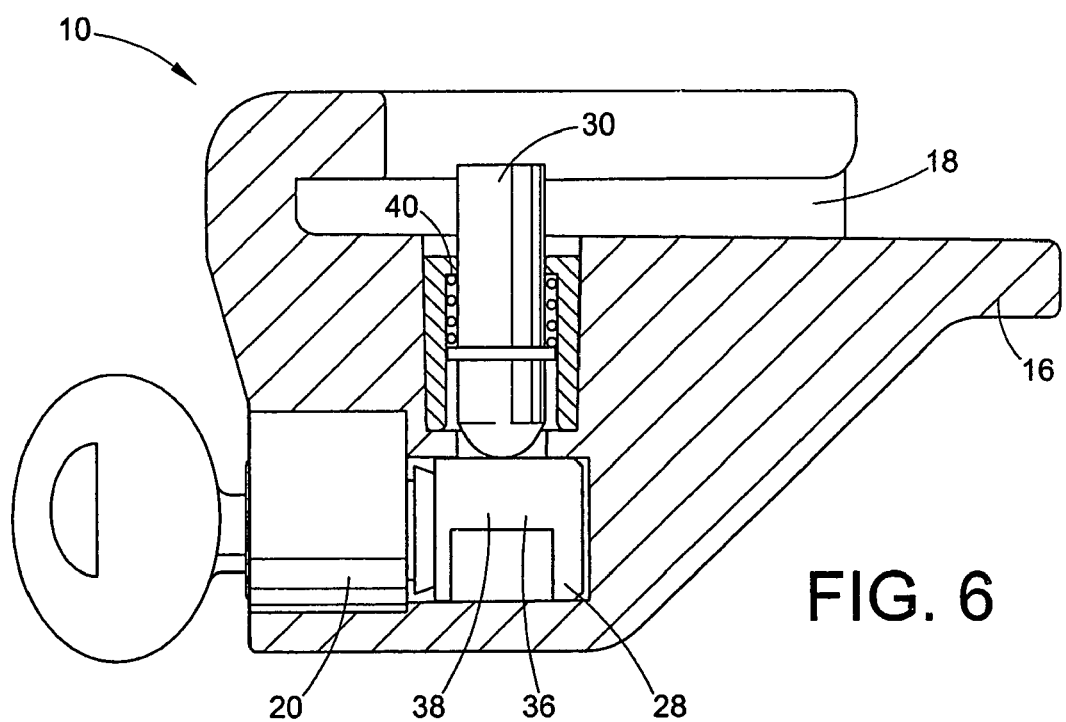
FIG. 6 is a cross-sectional view of the anti-theft mechanism of FIG. 1 with the locking pin in an extended position.

Referring to FIGS. 5 and 6, the locking pin 30 is moved between retracted and extended positions by the rotational motion of the lock cylinder 20 and the attached extension member 28. The extension member 28 is designed and shaped such that as the lock cylinder 20 is rotated from an unlocked position (as shown in FIG. 5) to a locked position (as shown in FIG. 6), the extension member 28 moves the locking pin 30 from a retracted position to an extended position. The extension member 28 is attached to the lock cylinder 20 such that a portion 36 of the extension member 28 is offset from the cylindrical axis of the extension member 28. In addition, the extension member 28 includes a curvilinear surface 38, on which the locking pin 30 rides as the extension member 28 rotates. The combination of the offset portion 36 of the extended member 28 and the locking pin 30 riding on the curvilinear surface 38 causes the locking pin 30 to move upward (with respect to FIGS. 5 and 6) towards the extended position as the lock cylinder 20 is moved from an unlocked to a locked position. As the lock cylinder 20 rotates from a locked to an unlocked position, the locking pin 30 again rides along the curvilinear surface 38 and moves downward (again with respect to FIGS. 5 and 6) towards the retracted position. As described and illustrated, the extension member 28 acts as a cam to transform rotational motion of the lock cylinder 20 to linear motion of the locking pin 30.

The downward movement of the locking pin 30 as the lock cylinder 20 rotates from a locked to an unlocked position can be facilitated by gravity, or can be assisted by a spring 40 positioned to bias the locking pin 30 towards the retracted position.

The inclusion of a separate securing device, such as the above-mentioned pin and tumble locking system, for enabling and disabling the movement of the locking pin allows for a method for placing the locking device 10 on a trailer coupler 12. The method includes the steps of inserting the proper key into the key slot 22, moving the locking pin 30 to an extended position, and removing the key from the key slot 22. This process secures the locking device 10 to the coupler 12 and prevents removal of the locking device 10 without use of the proper key 36.

The lock cylinder 20 has been described as having single locked and unlocked positions. However, it should be understood by those skilled in the art that a lock cylinder of the present invention can be arranged to have multiple locked and unlocked positions.

Other embodiments of a locking device 10 are illustrated in FIGS. 8 through 11. In these embodiments, the axial or linear movement of a locking pin 30 is facilitated by a different mechanism than described above in regard to FIGS. 3 through 6. The movement of the locking pin 30 is controlled by rotation of a locking pin housing 50. The rotation of the locking pin housing 50 is controlled by rotation of the lock cylinder 20.

The locking pin housing 50 is attached to the body 16 in a manner that allows for the locking pin housing 50 to rotate about a cylindrical axis. The locking pin housing 50 defines an inner cavity or chamber 52, which includes a threaded portion 54. The locking pin 30 is located within the chamber 52 and is able to move axially or linearly between extended and retracted positions, similarly to the above described embodiment illustrated in FIGS. 3 though 6. The locking pin 30 includes a threaded portion 56 that engages with the threaded portion 54 of the chamber 52. The linear movement of the locking pin 30 is facilitated by the engagement and interaction of the two threaded portions 54 and 56. The interaction of the threads is such that as the locking pin housing 50 is rotated in a first direction, the locking pin 30 is driven towards an extended position and as the locking pin housing 50 is rotated in a second and opposite direction, the locking pin 30 is driven towards a retracted position.

Figure 8:
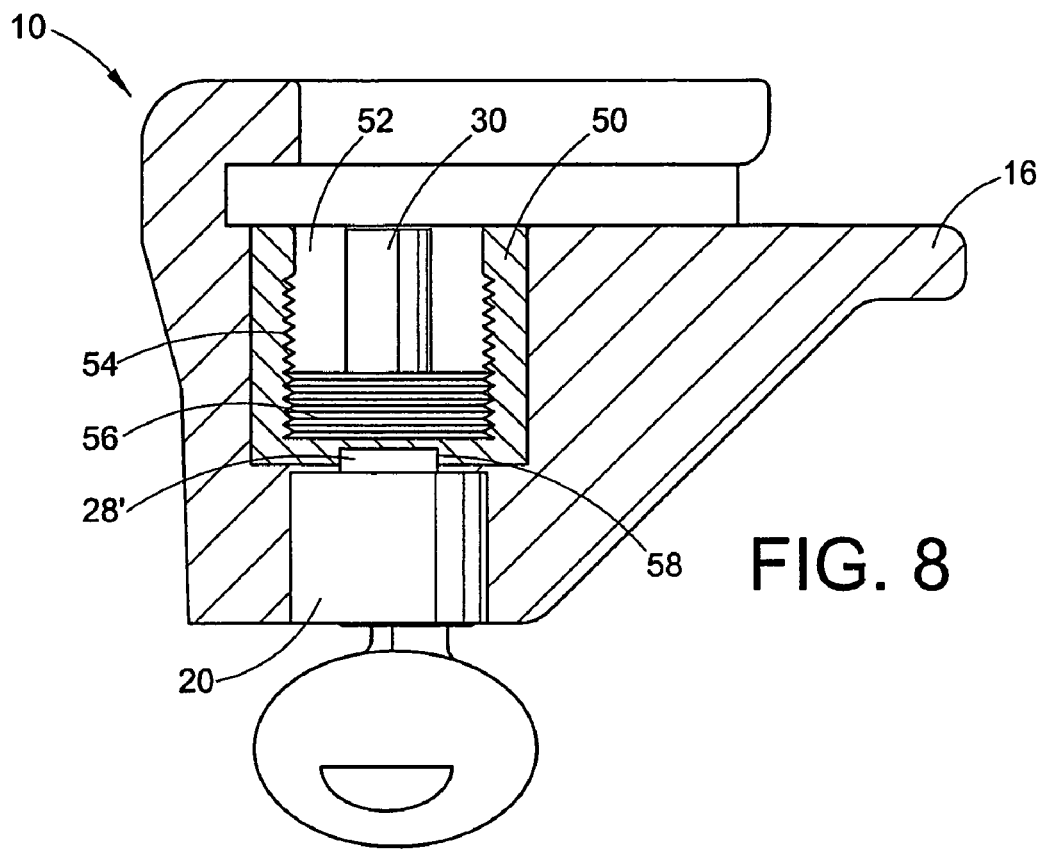
FIG. 8 is a cross-sectional view of an anti-theft mechanism, constructed in accordance with another embodiment of the present invention, with a locking pin in a retracted position.
Figure 9:
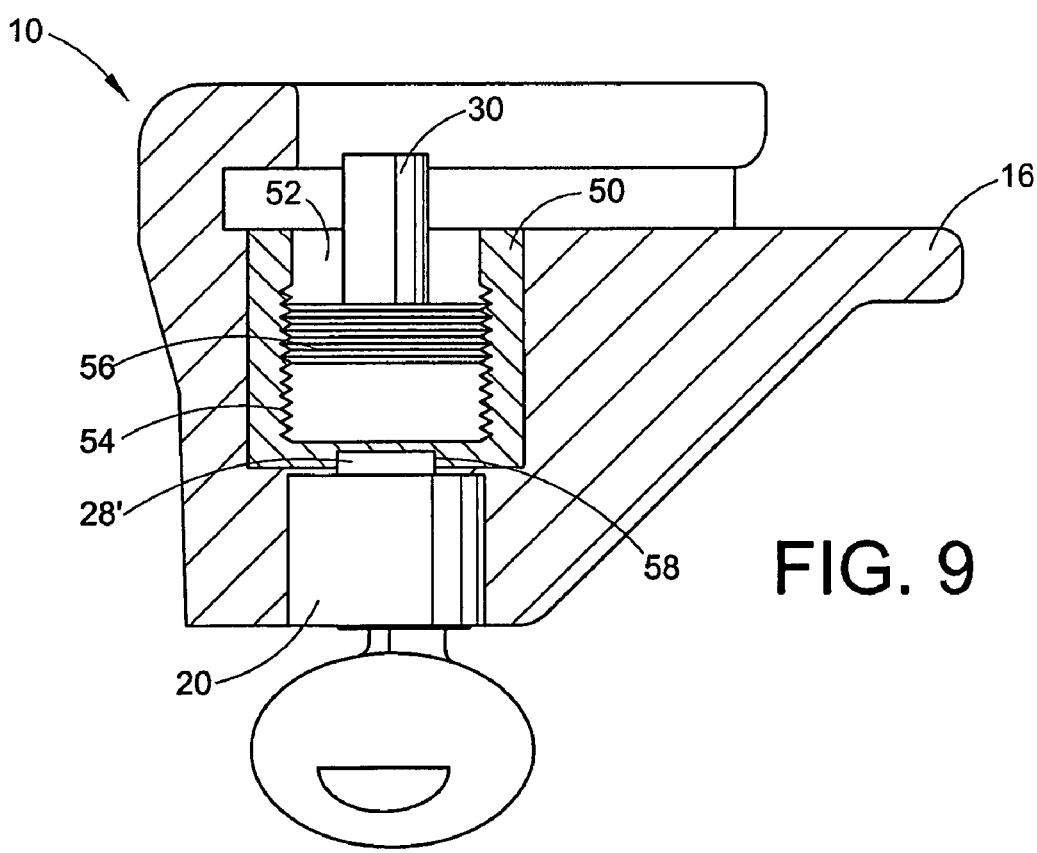
FIG. 9 is a cross-sectional view of the anti-theft mechanism of FIG. 8 with the locking pin in an extended position.

The locking device 10 can be designed such that rotational motion of the lock cylinder 20 is transferred to the locking pin housing 50 to cause the housing 50 to rotate. FIGS. 8 and 9 illustrate one such embodiment. An extension member 28' mechanically communicates the rotational motion of the lock cylinder 20 to the locking pin housing 50. The extension member 28' is attached to the lock cylinder 20 and the locking pin housing 50 includes a recession or groove 58 on an outer surface of the housing 50. This groove 58 is arranged to accept the extension member 28'. In this arrangement, the lock cylinder 20 is positioned to be inline and parallel to the locking pin 30 and the locking pin housing 50. As the lock cylinder 20 rotates, the extension member 28', which is mechanically fitted into the recess 58, causes the locking pin housing 50 to rotate. The threaded portion 54 of the cavity 52 and the threaded portion 56 of the locking pin 30 are arranged such that rotating the lock cylinder 20 from an unlocked to a locked position moves the locking pin 30 to the extended position (as illustrated in FIG. 9). Conversely, rotating the lock cylinder 30 from a locked position to an unlocked position (as illustrated in FIG. 8) moves the locking pin 30 to the retracted position.

Figure 10:
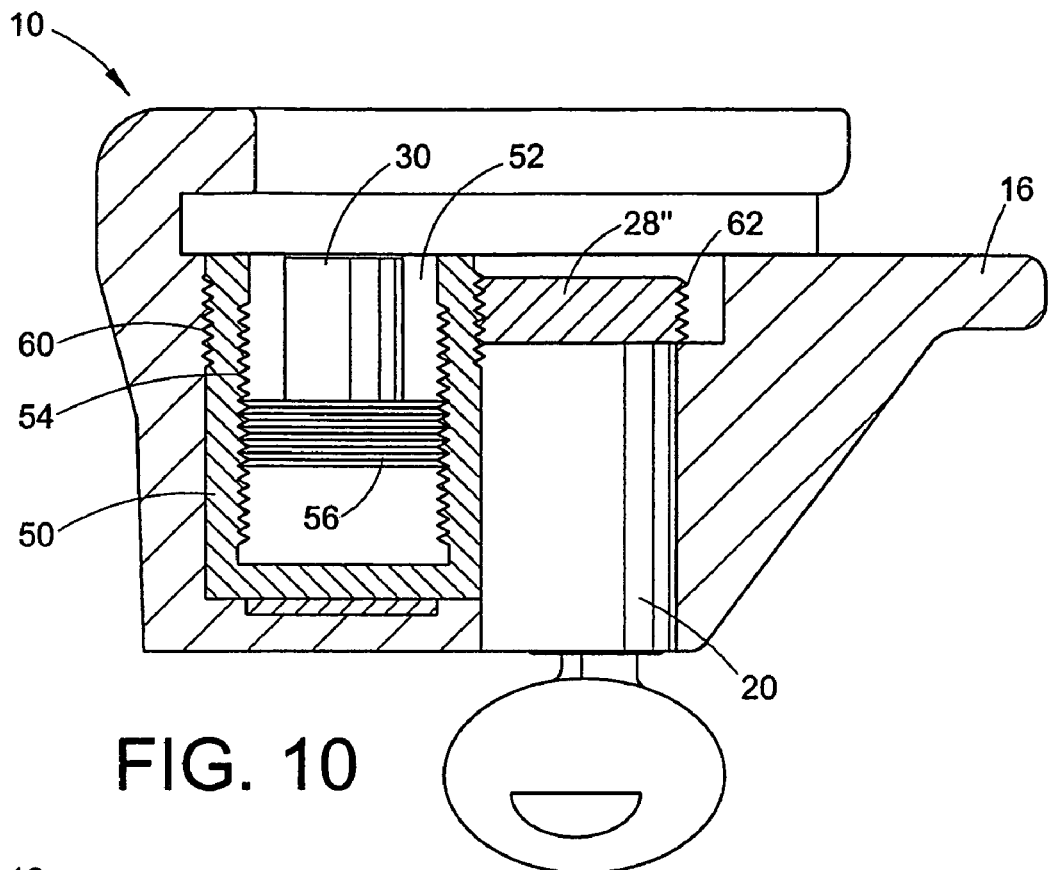
FIG. 10 is a cross-sectional view of an anti-theft mechanism, constructed in accordance with yet another embodiment of the present invention, with a locking pin in a retracted position.
Figure 11:
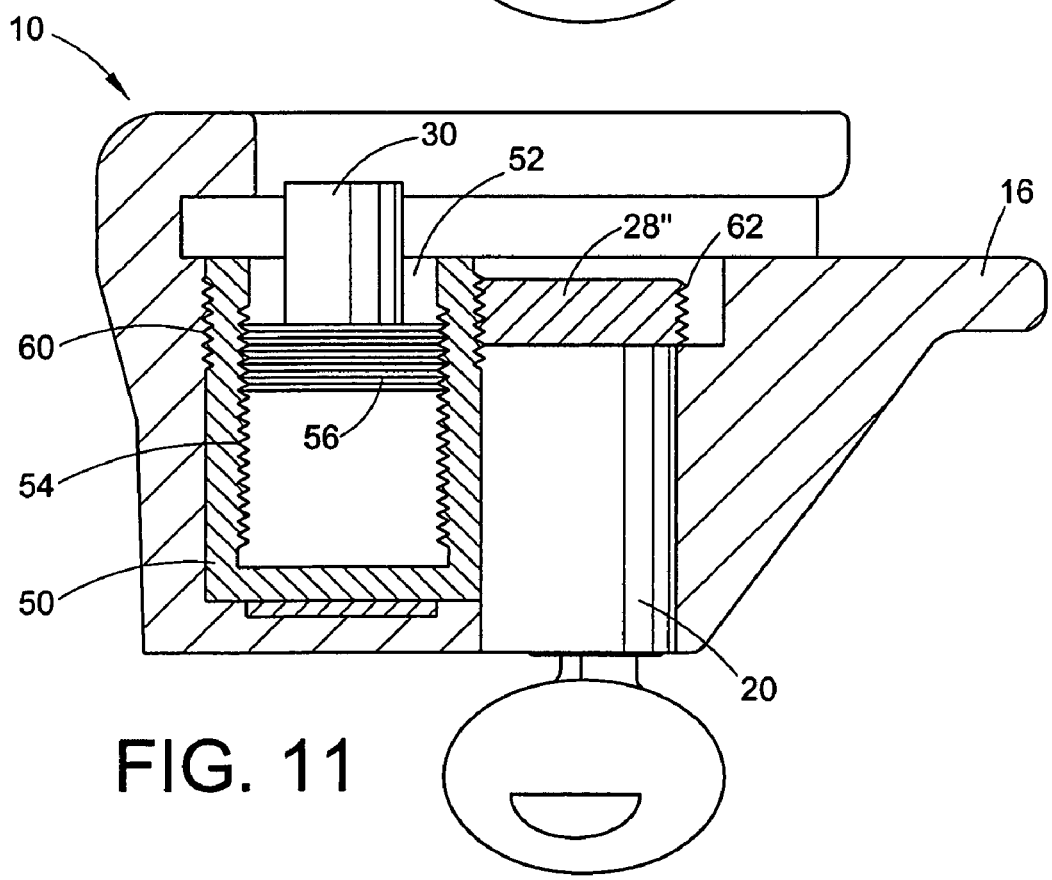
FIG. 11 is a cross-sectional view of the anti-theft mechanism with the locking pin in an extended position.

Referring to FIGS. 10 and 11, another embodiment that transfers rotational motion from a lock cylinder 20 to a locking pin housing 50 is illustrated. In this arrangement the interaction of the locking pin housing 50 and the locking pin 30 are the same as described above in FIGS. 8 and 9, however, the mechanism for mechanically communicating rotational movement from the lock cylinder 20 to the locking pin housing 50 is different. The lock cylinder 20 is positioned to be parallel and in tandem with the locking pin housing 50. An engagement feature 60 is located on the outer surface of the locking pin housing 50 and a second engagement feature 62 is located on an extension member 28". The engagement of these two features 60 and 62 creates mechanical communication between the lock cylinder 20 and the locking pin housing 50. The engagement of these features 60 and 62 are such that as the lock cylinder 20 is rotated in a first direction, the locking pin housing 50 is caused to rotate in a second and opposite direction and as the lock cylinder 20 is rotated in the second direction the locking pin housing 50 is rotated in the first and opposite direction. In the illustration of FIGS. 10 and 11, the engagement feature 62 on the extension member 28" is a gear and the engagement feature 60 on the locking pin housing 50 is also a gear arranged to engage with the extension member 28" to drive the rotation of the locking pin housing 50.

Figure 12:
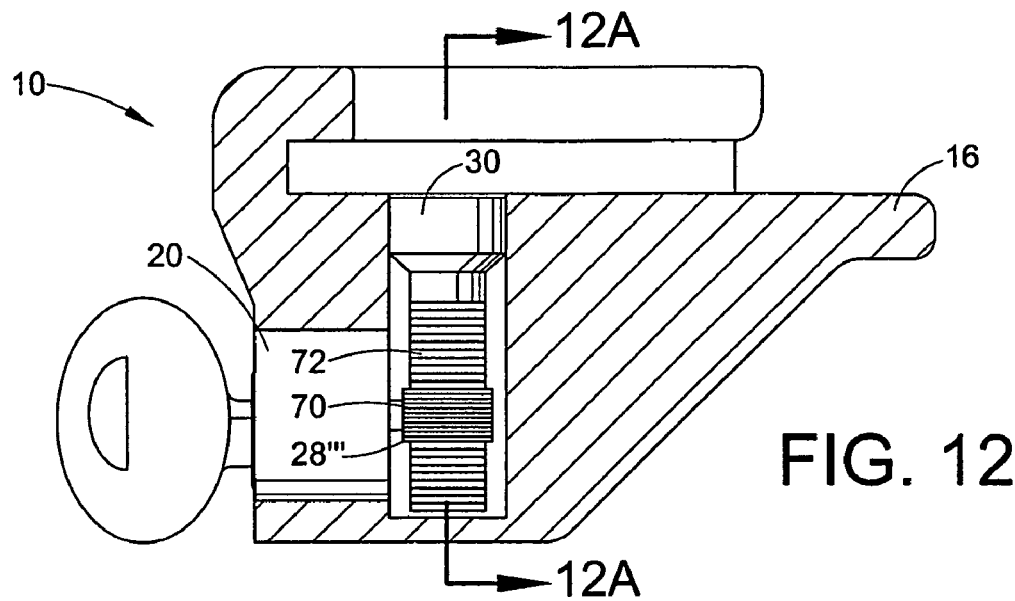
FIG. 12 is a cross-sectional view of an anti-theft mechanism, constructed in accordance with yet another embodiment of the present invention, with a locking pin in a retracted position.
Figure 12A:
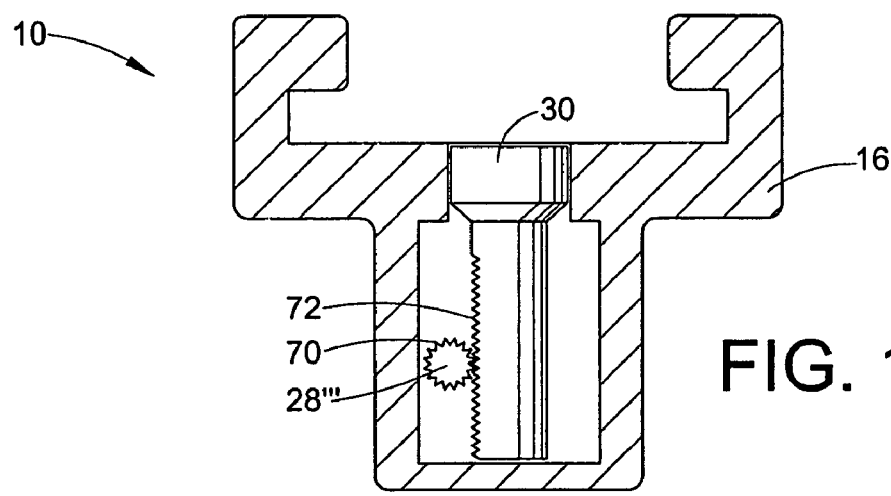
FIG. 12A is a cross-sectional view of the anti-theft mechanism of FIG. 12, taken along the line 12A-12A.
Figure 13:
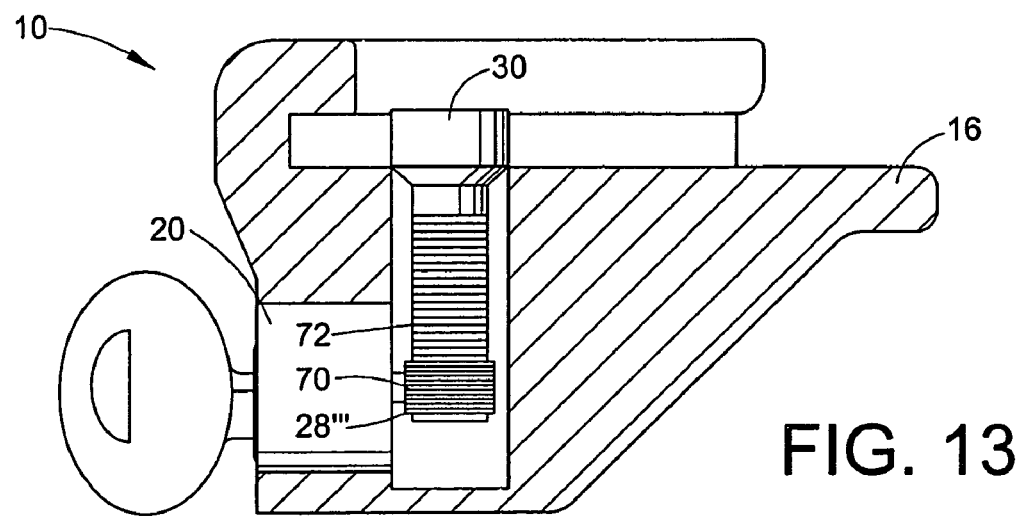
FIG. 13 is a cross-sectional view of the anti-theft mechanism of FIG. 12 with the locking pin in an extended position.

Another embodiment of a locking device 10 is illustrated in FIGS. 12, 12A and 13. This embodiment also includes an engagement feature 70 on an extension member 28''', with a corresponding engagement feature 72 on an outer surface of the locking pin 30. The lock cylinder 20 is arranged such that it is generally transversely positioned with respect to the locking pin 30. In the illustration shown, the engagement feature 70 on the extension member 28''' is a pinion gear and the engagement feature 72 on the locking pin 30 is a rack. This arrangement is such that rotational motion of the lock cylinder 20 is directly transferred to linear motion of the locking pin 30. Rotating the locking pin 30 from an unlocked position to a locked position moves the locking pin 30 from a retracted position (as shown in FIGS. 12 and 12A) to an extended position (as shown in FIG. 13). Conversely, rotating the lock cylinder 20 from a locked position to an unlocked position moves the locking pin 30 from an extended position to a retracted position.

Figure 14:
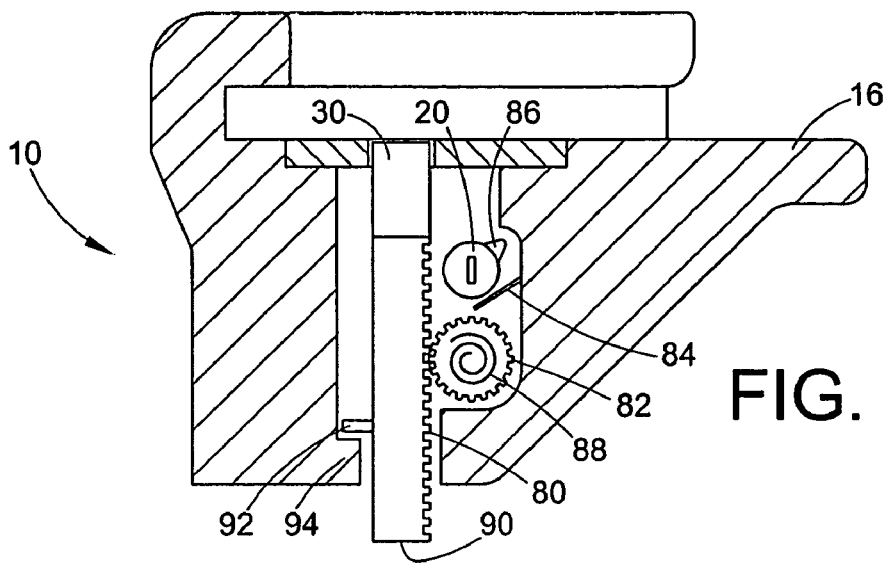
FIG. 14 is a cross-sectional view of an anti-theft mechanism, constructed in accordance with yet another embodiment of the present invention, with a spring clip disengaged from a pinion gear and a locking pin in a retracted position.
Figure 14A:
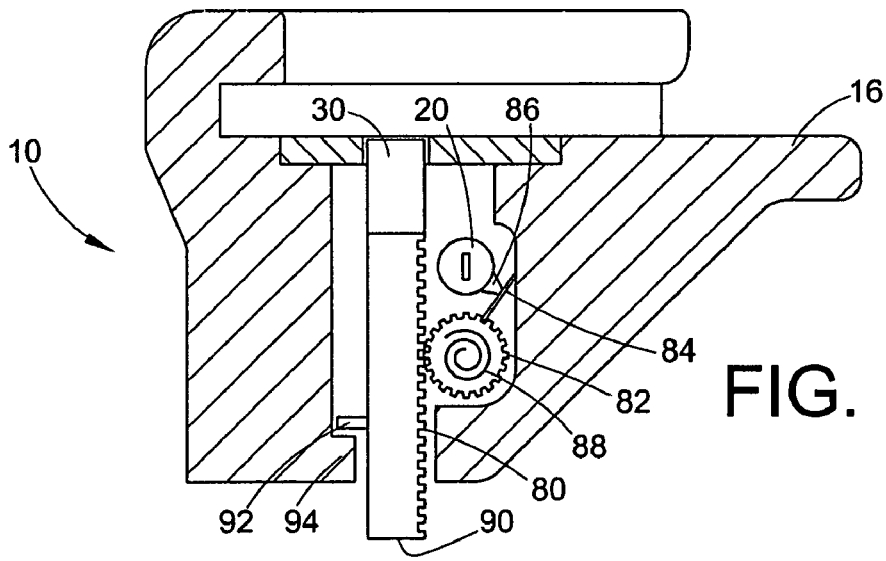
FIG. 14A is a cross-sectional view of the anti-theft mechanism of FIG. 14 with the spring clip engaged from the pinion gear and the locking pin in the retracted position.
Figure 15:
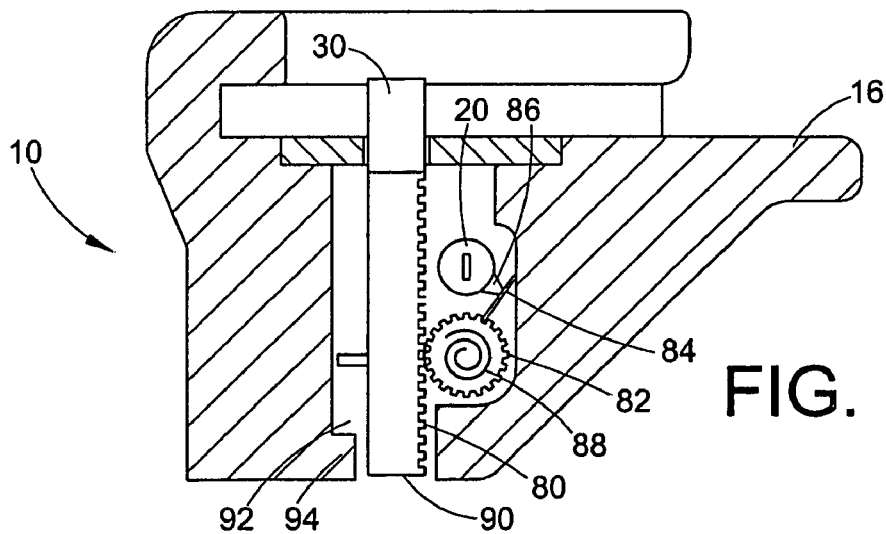
FIG. 15 is a cross-sectional view of the anti-theft mechanism of FIG. 14 with the spring clip engaged from the pinion gear and the locking pin in an extended position.

In other embodiments of locking device 10, rotating the locking cylinder 20 between unlocked and locked positions does not directly or indirectly move the locking pin 30 between retracted and extended positions. In these embodiments, the position of the lock cylinder 20 may be used to define two states, a first state where the locking pin 30 can be freely moved between extended and retracted positions and a second state where the locking pin 30 can only be moved towards the extended position. One such embodiment is illustrated in FIGS. 14, 14A, and 15. The embodiment shown includes a rack 80 incorporated into the surface of the locking pin 30, a pinion gear 82 positioned to be in contact with the rack 80, and a spring clip 84 that is selectively engaged with the pinion gear 82 by the movement of a control member 86 attached to the lock cylinder 20. As shown in FIGS. 14, 14A and 15, the rack 80 and pinion gear 82 are positioned such that as the locking pin 30 moves upward towards an extended position, the pinion gear 82 rotates clockwise. As the locking pin 30 moves downward towards a retracted position, the pinion gear 82 rotates counterclockwise. The embodiment may include a torsion spring 88 that biases the pinion gear 82 in the counterclockwise direction. As a result, the locking pin 30 is biased downward towards the retracted position.

The spring clip 84 is engaged with the pinion gear 82 (shown in FIGS. 14A and 15) when the lock cylinder 20 is in the locked position and disengaged with the pinion gear 82 (shown in FIG. 14) when the lock cylinder 20 is in the unlocked position. The spring clip 84 is a cantilever spring that is arranged such that its bias places the spring clip 84 out of engagement with the pinion gear 82. As the lock cylinder 20 is rotated from an unlocked position to a locked position, the control member 86 is rotated into contact with the spring clip 84, overcomes the spring clip 84 bias, and moves the spring clip 84 into engagement with the pinion gear 82. As the lock cylinder 20 is rotated from a locked position to an unlocked position, the control member 86 is moved out of contact with the spring clip 84 and the spring clip 84 disengages from the pinion gear 82. The control member 86 can be elliptical in shape.

While the spring clip 84 is engaged to the pinion gear 82, the gear 82 may only rotate clockwise. The spring clip 84, acting as a cantilever spring, allows the pinion gear 82 to rotate in the clockwise direction by flexing as the gear 82 rotates in the clockwise direction. However, the arrangement of the spring clip 84 and the control member 86 does not allow the spring clip 84 to flex when the pinion gear 82 attempts to rotate in the counterclockwise direction. Therefore, when the lock cylinder 20 is in the locked position, which engages the spring clip 84 with the pinion gear 82, counterclockwise movement of the gear 82 is resisted by the rack and pinion system. Resistance of counterclockwise movement of the gear 82 leads to a resistance of downward movement of the locking pin 30 towards the retracted position.

Still referring to the embodiment illustrated in FIG. 14, 14A and 15, the movement of the locking pin 30 into an extended position is accomplished by an action separate from placing the lock cylinder 20 in the locked position. Once a lock cylinder 20 is placed in the locked position, the user may manually move the locking pin 30 into the extended position. This action can be accomplished, for example, by the user placing the palm of the hand on a bottom surface 90 of the locking pin 30. By placing an upward force on the locking pin 30, the locking pin 30 can move upward toward the extended position, which will rotate the pinion gear 82 clockwise. As described above, the rack and pinion system allows clockwise rotation of the pinion gear 82. The embodiment can be arranged such that once the bottom surface 90 of the locking pin 30 is flush with the body 16, the locking pin 30 is in the extended position.

To move the locking pin 30 from this extended position to a retracted position, the lock cylinder 20 must be moved to an unlocked position. In an unlocked position, the spring clip 84 will be released from the pinion gear 82. The torsion spring 88, which biases the gear 82 in the counterclockwise direction, will rotate the gear 82 and the locking pin 30 will move from an extended position towards a retracted position. A protrusion 92 can be attached to the locking pin 30 to limit the downward movement of the pin 30 by arranging the protrusion 92 to contact a stop 94 and halt the downward movement of the locking pin 30. A linear spring (not shown) can be coupled to the locking pin 30 to bias the locking pin 30 in a downward direction towards the retracted position. As such, the linear spring assists the torsion spring 88 attached to the pinion gear 82, i.e., replace the function of the torsion spring 88.

Figure 16:
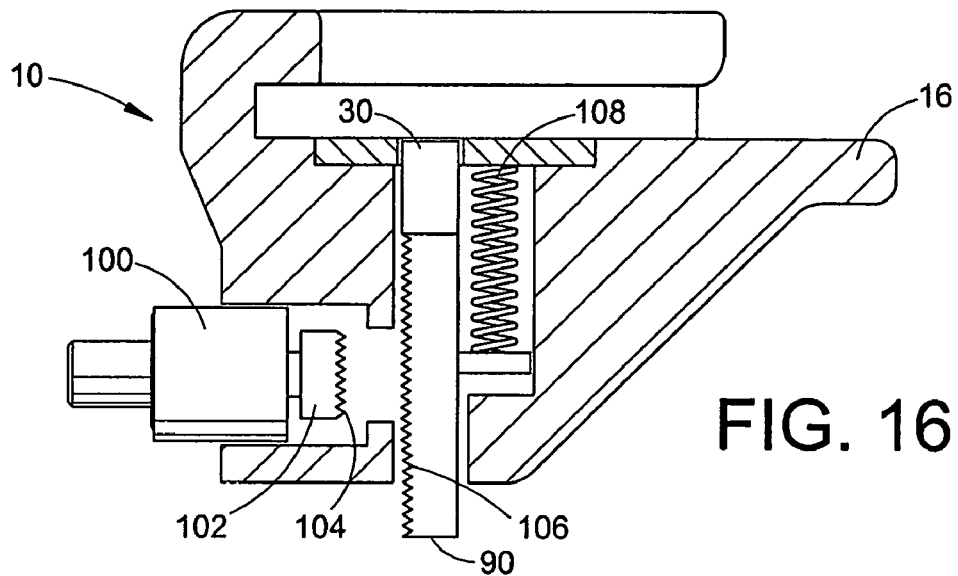
FIG. 16 is a cross-sectional view of an anti-theft mechanism, constructed in accordance with yet another embodiment of the present invention, with a push cylinder in an unlocked position and a locking pin in a retracted position.
Figure 16A:
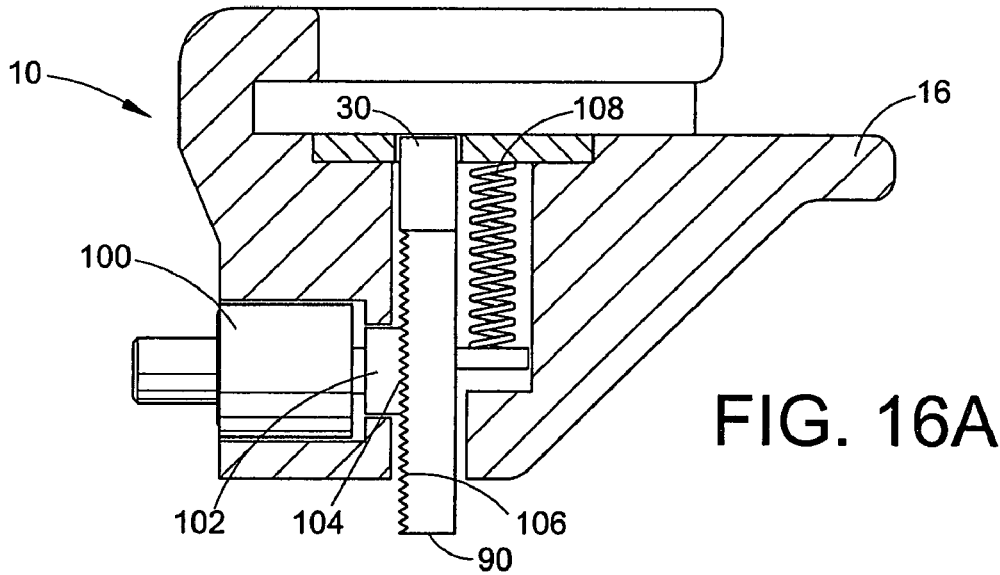
FIG. 16A is a cross-sectional view of the anti-theft mechanism of FIG. 16 with the push cylinder in a locked position and the locking pin in the retracted position.
Figure 17:
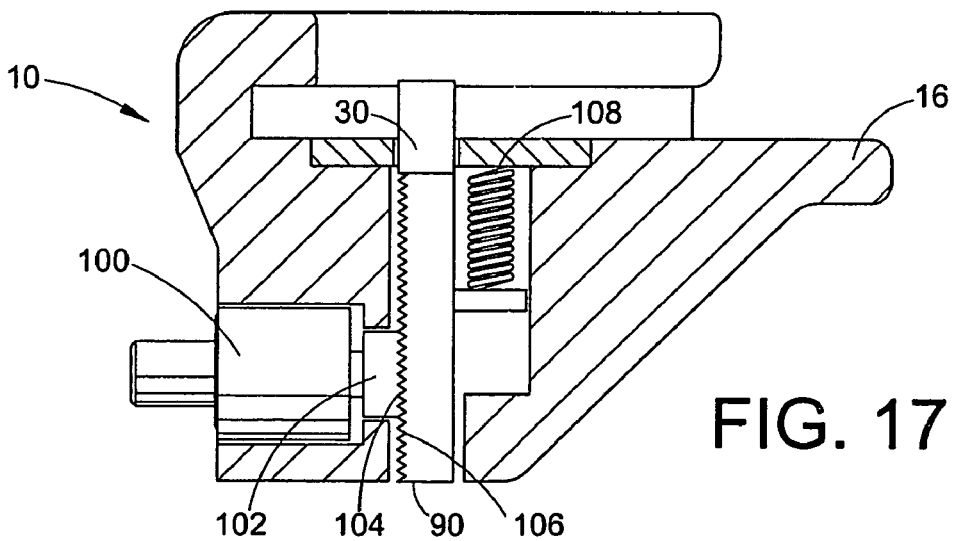
FIG. 17 is a cross-sectional view of the anti-theft mechanism of FIG. 16 with the push cylinder in the locked position and the locking pin in an extended position.

Yet another embodiment of a locking device 10 is illustrated in FIGS. 16, 16A and 17. This embodiment is similar to the embodiment illustrated in FIGS. 14, 14A and 15, in that a separate action is needed to move the locking pin 30 to an extended position once a lock cylinder 20 is placed in a locked position. This embodiment includes a push cylinder 100 in place of a lock cylinder 20. Similar to the lock cylinder 20, the push cylinder 100 has locked and unlocked positions. However, the cylinder is arranged to move linearly as opposed to rotationally. Typically, the push cylinder 100 is fixed to the body 16 and can move axially between an unlocked position, where a substantial portion of the cylinder 100 extends outside the body 16, and a locked position, where a substantial portion or the entire cylinder 100 is retracted into the body 16. The push cylinder 100 is typically configured such that manually pushing the cylinder 100 into the body 16 until the end of the cylinder 100 is flush with the body 16 causes the cylinder 100 to lock, regardless of whether a key is inserted in a key slot. To unlock the push cylinder 100, a key, such as tubular key for example, must be inserted into a key slot and turned. The turning of the key unlocks the cylinder 100 and the cylinder is moved to the unlocked position by a spring (not shown) that biases the cylinder 100 towards the unlocked position.

As shown, an engagement member 102 is attached to the lock cylinder 100. The engagement member 102 includes a first ratcheting feature 104 and the locking pin 30 includes a second ratcheting feature 106. The ratcheting features 104 and 106 are selectively engagable. When the push cylinder 100 is in the locked position, the ratcheting features 104 and 106 are engaged and when the push cylinder 100 is in the unlocked position, the ratcheting features 104 and 106 are disengaged. Similar to the rack and pinion system described above, the ratcheting features 104 and 106 are designed such that when engaged, the locking pin 30 may only move toward the extended position and when disengaged, the locking pin 30 is free to move between extended and retracted positions.

One arrangement of the ratcheting features 104 and 106 is for the ratcheting feature 106 on the locking pin 30 to include sloped teeth, while the ratcheting feature 104 on the engagement member 102 serves as the pawl. In this arrangement, when the pawl is engaged with the teeth, the locking pin 30 is only allowed to move toward the extended position. Movement of the locking pin 30 towards a retracted position is resisted by the engagement of the teeth and the pawl.

Similar to the embodiment of FIGS. 14, 14A and 15, once the push cylinder 100 is placed in a locked position (shown in FIGS. 16A and 17), which engages the ratcheting features 104 and 106, a second action must be taken to move the locking pin 30 into the extended position. The user can manually place force on a bottom surface 90 of the locking pin 30 and move locking pin 30 upward until the bottom surface 90 of the locking pin 30 is flush with the body 16, which places the locking pin 30 in an extended position. To return the locking pin 30 to the retracted position, the push cylinder 100 is unlocked or otherwise moved to an unlocked position, which disengages the ratcheting features 104 and 106. The locking pin 30 is moved downward towards a retracted position by a force, such as for example, gravity or bias from a spring 108.

In various embodiments, features have been described as, for example, engagement features, ratcheting features, and rack and pinion systems. It should be understood by those skilled in the art that these descriptions are mere exemplary methods and apparatuses of transfer motion or limit movement. Any similar or equivalent methods and apparatuses are included and incorporated into this disclosure.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

I claim:

1. An anti-theft mechanism for securing a trailer coupler comprising:
   a. a body having a retention portion;
   b. a lock cylinder fixed to the body and rotatably moveable between locked and unlocked positions;
   c. an extension member attached to the lock cylinder; and
   d. a locking pin located proximate to the extension member and moveable between retracted and extended positions;
   wherein, when the lock cylinder is rotated to the locked position, the extension member rotates to move the locking pin to the extended position and when the lock cylinder is rotated to the unlocked position, the locking pin moves towards the retracted position.

2. The anti-theft mechanism of claim 1 wherein the trailer coupler includes a lip portion;
   further wherein, the retention portion is sized to mate with the lip portion.

3. The anti-theft mechanism of claim 2 wherein when the retention portion is mated with the lip portion, moving the locking pin to the extended position secures the body to the trailer coupler.

4. The anti-theft mechanism of claim 1 wherein as the lock cylinder is moved to the unlocked position, the extension member is moved towards the retracted position by a biasing member.

5. The anti-theft mechanism of claim 4 wherein the biasing member is a spring.

6. The anti-theft mechanism of claim 1 further including a key slot, wherein the lock cylinder is rotatably movable after insertion of a key into the key slot.

7. The anti-theft mechanism of claim 1 wherein the extension member is a camming member.

8. The anti-theft mechanism of claim 7 wherein the camming member includes a curvilinear surface upon which the locking pin rides on to the extended position.

9. The anti-theft mechanism of claim 1 wherein the extended member further includes an offset portion having a curvilinear surface.

10. The anti-theft mechanism of claim 1 wherein the locking pin is located transversely with respect to the lock cylinder.

11. An anti-theft mechanism for securing a trailer coupler comprising:
   a body having a retention portion;
   a lock cylinder fixed to the body and rotatably moveable about a lock cylinder axis between locked and unlocked positions;
   an extension member attached to the lock cylinder; and
   a locking pin located proximate to the extension member and axially slideable along an axis angled with respect to the lock cylinder axis between retracted and extended positions;
   wherein, when the lock cylinder is rotated to the locked position, the extension member moves the locking pin to the extended position and when the lock cylinder is rotated to the unlocked position, the locking pin moves towards the retracted position.

12. An anti-theft mechanism for securing a trailer coupler comprising:
   a body having a retention portion;
   a lock cylinder fixed to the body and rotatably moveable about a lock cylinder axis between locked and unlocked positions;
   an extension member attached to the lock cylinder; and
   a locking pin located proximate to the extension member and movable between retracted and extended positions;
   wherein, when the lock cylinder is rotated to the locked position, a contoured camming surface of the extension member axially slides the locking pin to the extended position.

* * * * *